United States Patent
Grabowski

[11] 3,714,512
[45] Jan. 30, 1973

[54] PROTECTION CIRCUIT FOR TRANSISTOR MODULATORS

[75] Inventor: Stanley J. Grabowski, Fayetteville, N.Y.

[73] Assignee: General Electric Company

[22] Filed: April 6, 1972

[21] Appl. No.: 241,856

Related U.S. Application Data

[63] Continuation of Ser. No. 127,905, March 25, 1971, abandoned.

[52] U.S. Cl. ............... 317/33 VR, 307/297, 323/9, 323/22 T
[51] Int. Cl. ............................ H02h 3/20, G05f 1/58
[58] Field of Search .317/33 VR; 323/9, 22 T, 22 SC; 307/297

[56] References Cited

UNITED STATES PATENTS

| | | |
|---|---|---|
| 2,978,630 | 4/1961 | De La Tour ............... 317/33 VR |
| 3,218,542 | 11/1965 | Taylor ........................... 323/22 T |
| 3,391,330 | 7/1968 | Grossoehme ....................... 323/9 |
| 3,582,713 | 6/1971 | Till ............................... 317/33 VR |

Primary Examiner—Gerald Goldberg
Attorney—Charles K. Wright, Jr. et al.

[57] ABSTRACT

A load circuit is controlled by a darlington pair, which in turn is controlled by a transistor sensing circuit. A further transistor is provided in the sensing circuit to sense the current flow to the load. When excess current is flowing to the load this additional transistor will cause the sensing circuit to turn the darlington pair off, therefore limiting the amount of current flow to the load.

1 Claim, 1 Drawing Figure

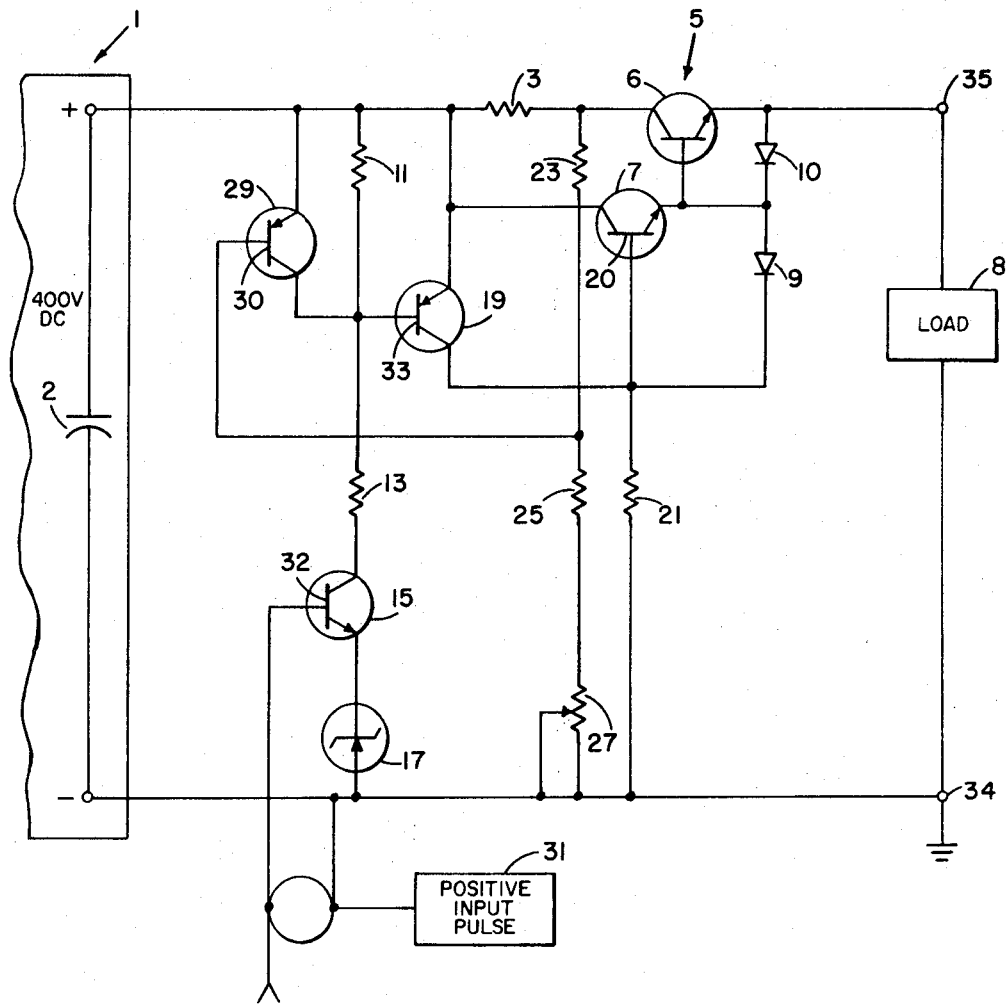
PATENTED JAN 30 1973  3,714,512
Stanley J. Grabowski,
INVENTOR.
BY Jack W. Voigt
Robert C. Sims

PROTECTION CIRCUIT FOR TRANSISTOR MODULATORS

This is a continuation, of application Ser. No. 127,905, filed Mar. 25, 1971, now abandoned.

BACKGROUND OF THE INVENTION

This invention is directed to the field of voltage regulation circuits. More particular this invention is directed to transistor voltage regulator circuits which have protection means to prevent overloads. Prior art circuits for this purpose are not very efficient in that they require the use of a high voltage non-economical transistor. The prior art required this high voltage transistor in that due to its location in the circuit it was dependent on total voltage and current across the load. The prior art usually required more than one additional transistor to provide the necessary current protection to the load.

SUMMARY OF THE INVENTION

A source of energy is connected to a load by way of a darlington pair. The darlington pair regulates the current and voltage to the load in response to a sensing circuit. The sensing circuit is connected across the voltage source and has a controlled transistor therein which is controlled by outside means. The sensing circuit controls a further transistor which in turn controls the darlington pair. A resistor is connected in series with the source load and the darlington pair. A voltage dividing circuit is connected across the source between the resistor and the darlington pair. A further transistor is connected between the source and the base of the control transistor. The base of this transistor is connected to the midpoint of the voltage divider. At normal load current this transistor is in an off condition; however, when the current to the load becomes excessive, the voltage across the series resistor will cause this transistor to turn on. This will turn off the control transistor which in turn will cause the darlington pair to turn off and stop the overload current flow to the load.

BRIEF DESCRIPTION OF THE DRAWING

The single FIGURE is a schematic showing of a preferred embodiment of the invention.

DESCRIPTION OF THE PREFERRED EMBODIMENT

A 400 volt DC voltage source 1 having capacitance 2 is connected to load 8 by way of resistor 3 to darlington pair 5. Darlington pair 5 is the regulator and is made up of transistors 6 and 7 with the connections to protection rectifiers 9 and 10 which may be omitted. A control circuit is connected directly across the source 1 and is made up of resistors 11 and 13, transistor 15, and Zener diode 17. Transistor 15 may be controlled by outside means not shown. A controlled transistor 19 is connected to the positive side of the source and the base 20 of transistor 7 which is the input of the regulator 5. The base of transistor 19 is connected between resistors 11 and 13. The base of transistor 7 is connected to the negative side of source 1 and ground by resistor 21. A voltage dividing circuit is connected in series with source 1 and resistor 3. This voltage dividing circuit is made up of resistors 23, 25 and adjustable resistor 27. A low voltage protection transistor 29 is connected between the positive side of source 1 and the base of transistor 19. The base 30 of transistor 29 is its control input and is connected between resistors 23 and 25.

In normal operation positive input pulse 31 is fed to base 32 of transistor 15 to turn transistor 15 on. This causes transistor 19 to become operational and to control darlington pair 5 in response to current flow at the base 33. Under normal load and voltage conditions, the voltage across resistors 3 and 23 is not sufficient to turn the transistor 29 on. However, upon a short circuit or over voltage, the current flow to load 8 will become excessive, and the voltage across resistor 3 will rise proportionally causing transistor 29 to turn on. Due to the connection of transistor 29 to the base of transistor 19, transistor 19 will now be turned off. This will cause the darlington pair to be turned off, and the load voltage at output terminals 34 and 35 will go to zero.

For prior art operation of the circuit without the inventive concept, see GE Transistor Manual, 7th edition, pages 232 and 233, FIG. 10.9.

I CLAIM:

1. A circuit for controlling current and voltage applied to a load comprising a direct current voltage source; current sensing means, composite transistor regulator means and load means serially connected to said voltage source; protection circuit means connected intermediate said voltage source and said regulator means, said protection circuit means including a first transistor and a second transistor, the collector electrode of said first transistor connected to the input of said composite transistor regulator means, the collector electrode of said second transistor connected to the base of said first transistor, the emitter electrodes of said first and second transistors connected to said voltage source, a voltage divider connected across said voltage source between said current sensing means and said regulator means, the base of said second transistor connected to said voltage divider; control circuit means including positive pulse means, a Zener diode, a transistor and resistor means serially connected to the base electrode of said first transistor, biasing means connected to the input of said composite transistor regulator means and diode means connected between the emitter electrodes of said composite transistor regulator means and the input of said composite transistor regulator means, said positive pulse means controlling conduction of said first transistor under normal current and voltage conditions to said load, said current sensing means and said voltage divider controlling conduction of said second transistor under abnormal conditions of current and voltage to said load to prevent conduction of said first transistor and said composite transistor regulator means thereby cutting off current and voltage to said load.

* * * * *